(12) United States Patent
Fujimori et al.

(10) Patent No.: US 6,574,741 B1
(45) Date of Patent: Jun. 3, 2003

(54) COMMUNICATIONS APPARATUS WITH LIGHT EMITTING ELEMENTS

(75) Inventors: Junichi Fujimori, Hamamatsu (JP); Yoshihiro Inagaki, Hamamatsu (JP); Hirotaka Kuribayashi, Hamamatsu (JP); Takeshi Ando, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/416,494

(22) Filed: Oct. 12, 1999

(30) Foreign Application Priority Data

Oct. 13, 1998 (JP) .......................................... 10-291041

(51) Int. Cl.$^7$ ............................................... G06F 1/26
(52) U.S. Cl. ...................... 713/330; 713/300; 713/323; 713/324; 713/340; 709/249; 709/250; 709/251; 709/252; 709/253; 370/226; 370/254; 370/255; 370/256; 370/257; 370/258
(58) Field of Search ................................ 709/249, 250, 709/251, 252, 253; 713/300, 323, 324, 330, 340; 370/226, 254–258

(56) References Cited

U.S. PATENT DOCUMENTS

| | | | | |
|---|---|---|---|---|
| 5,764,151 A | * | 6/1998 | Wu ............................. | 340/635 |
| 5,799,196 A | * | 8/1998 | Flannery ................. | 395/750.03 |
| 5,990,577 A | * | 11/1999 | Kamioka et al. ............. | 307/26 |
| 6,198,384 B1 | * | 3/2001 | Oi et al. ...................... | 340/333 |
| 6,246,748 B1 | * | 6/2001 | Yano ............................ | 379/2 |
| 6,285,092 B1 | * | 9/2001 | Kawahara et al. ............ | 307/85 |
| 6,292,161 B1 | * | 9/2001 | Andersson et al. ........... | 345/82 |
| 6,502,129 B1 | * | 12/2002 | Stewart et al. ............... | 709/222 |
| 2001/0054123 A1 | * | 12/2001 | Henrikson et al. ........... | 710/100 |

FOREIGN PATENT DOCUMENTS

| | | |
|---|---|---|
| AU | B-61705/86 | 2/1987 |
| DE | 297 12 043 U1 | 9/1998 |
| EP | 0 896 264 A1 | 2/1999 |
| JP | 62-47239 | 2/1987 |
| JP | 8-51447 | 2/1996 |
| JP | 10-41032 | 2/1998 |
| JP | 10-134892 | 5/1998 |
| JP | 10-224384 | 8/1998 |
| JP | 10-233051 | 9/1998 |
| JP | 10-260761 | 9/1998 |

OTHER PUBLICATIONS

Derwent patent abstract DE 3530262 (corresponds to AU–B–61705/86).

* cited by examiner

*Primary Examiner*—Thomas Lee
*Assistant Examiner*—Nitin C Patel
(74) *Attorney, Agent, or Firm*—Morrison & Foerster LLP

(57) ABSTRACT

A communications apparatus having: a communication cable receptacle having signal terminals and power supply terminals for connection to a communication cable having signal lines and power supply lines; a communication interface for transferring a signal to and from an external via the signal terminals of the communication cable receptacle; and one or a plurality of light emitting elements capable of emitting light, the light emitting element being disposed near the communication cable receptacle, being selectively connected to the power supply terminals of the communication cable receptacle, and being capable of displaying at least one of a communication state, a state of the apparatus, an alarm state, and a connection state of the apparatus while receiving a power from the communication cable via the power supply terminals.

38 Claims, 6 Drawing Sheets

COMMUNICATIONS APPARATUS WITH LIGHT EMITTING ELEMENTS

This application is based on Japanese patent application No. 10-291041 filed on Oct. 13, 1998, the entire contents of which are incorporated herein by reference.

BACKGROUND OF THE INVENTION a) Field of the Invention

The present invention relates to a communications apparatus and more particularly to a communications apparatus with light emitting elements.

b) Description of the Related Art

There are technical trends for latest personal computers to mount digital serial communication interfaces such as IEEE 1394 specifications and universal serial buses (USB).

FIG. 6 shows an example of the structure of a communications network of IEEE 1394 specifications. Four nodes ND1 to ND4 are communications apparatuses having a communication interface and connected. by communication cables CBL.

A general communication cable has signal (data) lines. A communication cable of IEEE 1394 and USB is characterized in that it has power supply lines as well as signal lines. Since the communication cable has power supply lines, communications are possible even if the power switches of not all the nodes ND1 to ND4 are turned off. The nodes ND1 to ND4 can communicate with each other while receiving a power from the power supply lines of the communication cables.

For example, even if the power switches of the nodes ND1, ND3 and ND4 are turned on and the power switch of the node ND2 is turned off, communications between the nodes ND1 and ND4 are possible. In this case, the node ND2 operates as a repeater while receiving a power from the power supply lines 17 of the communication cables CBL. Namely, the node ND2 can relay a signal between the nodes ND1 and ND3.

A communications modem has light emitting diodes (LED) for displaying a communication state. A hard disk drive and a floppy disk drive have a light emitting diode for displaying an access state to a storage medium. If a communications apparatus is provided with a light emitting diode for displaying a communication state, a user can conveniently recognize the communication state.

If the power switch of a communications modem, a hard disk drive or the like is turned off, the light emitting diode cannot emit light. In this case, since a communications modem, a hard disk drive or the like does not perform communications while the power switch is turned off, it poses any practical problem even if the communication state is not displayed.

In IEEE 1394 or the like, even if the power switch of, for example, the node ND2 is turned off, the node ND2 operates as a repeater. Therefore, the communication state of the node ND2 is sometimes desired to be confirmed. However, in this case, it is difficult to drive light emitting diodes of the node ND2 when the power switch of the node ND2 is turned off. It is desired to know the communication state of the node ND2 even if the power switch of the node ND2 is turned off.

SUMMARY OF THE INVENTION

It is an object of the present invention to provide a communications apparatus capable of displaying a communication state even if the power of the apparatus is turned off.

According to one aspect of the present invention, there is provided a communications apparatus comprising: a communication cable receptacle having signal terminals and power supply terminals for connection to a communication cable having signal lines and power supply lines; a communication interface for transferring a signal to and from an external via the signal terminals of the communication cable receptacle; and one or a plurality of light emitting elements capable of emitting light, the light emitting element being selectively connected to the power supply terminals of the communication cable receptacle and receiving a power from the communication cable via the power supply terminals.

According to another aspect of the invention, there is provided a communications apparatus comprising: a communication cable receptacle having signal terminals and power supply terminals for connection to a communication cable having signal lines and power supply lines; a communication interface for transferring a signal to and from an external via the signal terminals of the communication cable receptacle; and one or a plurality of light emitting elements capable of emitting light, the light emitting element being disposed near the communication cable receptacle, being selectively connected to the power supply terminals of the communication cable receptacle, and being capable of displaying at least one of a communication state, a state of the apparatus, an alarm state, and a connection state of the apparatus while receiving a power from the communication cable via the power supply terminals.

Since the light emitting element can receive a power from an external via the power supply terminals of the communication cable receptacle, it can emit light even if the power cannot be supplied from the communications apparatus.

Even if the power cannot be supplied from the communications apparatus, the state such as the communication state can be displayed so that a user can always and conveniently confirm the communication state.

DETAILED DESCRIPTION OF THE PREFERRED EMBODIMENTS

Figure 1:
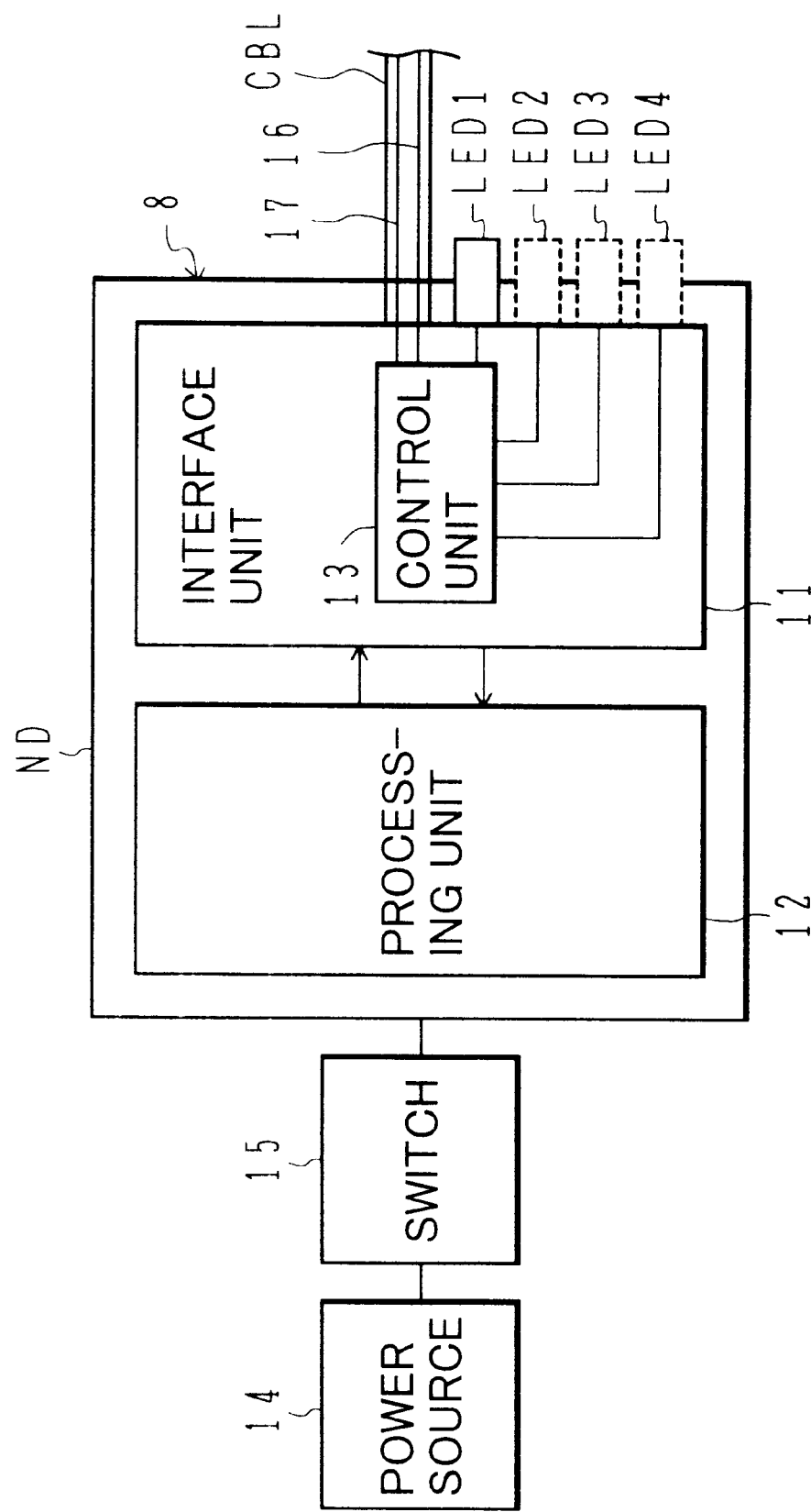
FIG. 1 is a block diagram showing the structure of a communications apparatus according to an embodiment of the invention.

FIG. 1 shows the structure of a communications apparatus (hereinafter called a node) ND according to the embodiment of the invention. The node ND corresponds to each of the nodes ND1 to ND4 constituting the network shown in FIG. 6.

The node ND has a communication interface unit 11 and a processing unit 12. The communication interface unit 11 has a communication interface for communications with other communications apparatuses (nodes), such as a communication interface of IEEE 1394 or USB.

The processing unit 12 is a digital signal processing unit, such as a tone generator unit for generating a musical tone signal and an image generating unit for generating a video signal. The processing unit 12 can transfer a signal to and from the communication interface unit 11.

The node ND is connected to a communication cable CBL. The communication cable CBL has signal lines 16 for signal communications and power supply lines 17 for power supply.

The node ND is connected via a power switch 15 to an AC 100 V power source (or battery) 14. When the power switch 15 is turned on, the processing unit 12 of the node ND is supplied with a power from the AC 100 V power source (or battery) 14.

The communication interface unit 11 is connected to the communication cable CBL so that it can operate while receiving a power from the power supply lines 17 of the communication cable CBL. When the power switch 15 of the node ND is turned off, although the processing unit 12 cannot be operated, the communication interface unit 11 can operate.

Since the communication interface unit 11 can receive a power from the power supply lines 17 of the communication cable CBL, communications are possible even if the power switches of not all the nodes ND1 to ND 4 are turned on. For example, even if the power switches of the nodes ND1, ND3 and ND4 are turned on and the power switch of the node ND2 is turned off, communications between the nodes ND1 and ND4 are possible.

In this case, the node ND2 functions as a repeater while receiving a power from the power supply lines 17 of the communication cables CBL. The node ND2 relays a signal between the nodes ND1 and ND3. The node ND2 receives a power from the nodes ND1, ND3 and/or ND4 via the power supply lines 17 of the communication cable or cables CBL. The power source 14 can be connected via the power switch 15 to the power source lines 17 of the communication cable CBL so that a power can be supplied to other nodes ND via the power supply lines 17.

Referring to FIG. 1, the node ND has, for example, four light emitting elements LED1, LED2, LED3 and LED4 near a receptacle for the communication cable CBL. For example, the light emitting elements LED1 to LED4 are light emitting diodes. In the following description, it is assumed that the light emitting elements LED1 to LED4 are light emitting diodes.

The communication interface unit 11 has a control unit 13. The control unit 13 controls to selectively connect the four light emitting diodes LED1 to LED4 to the power supply lines 17 of the communication cable CBL so that a desired one of the light emitting diodes LED1 to LED4 can emit light. The light emitting diodes LED1 to LED4 can emit light while receiving a power via the communication cable CBL even if the power switch 15 of the node ND is turned off. The emitting diodes LED1 to LED4 can be selectively connected to the power source 14 of their node ND to receive a power from the power source 14 and emit light.

Figure 2:
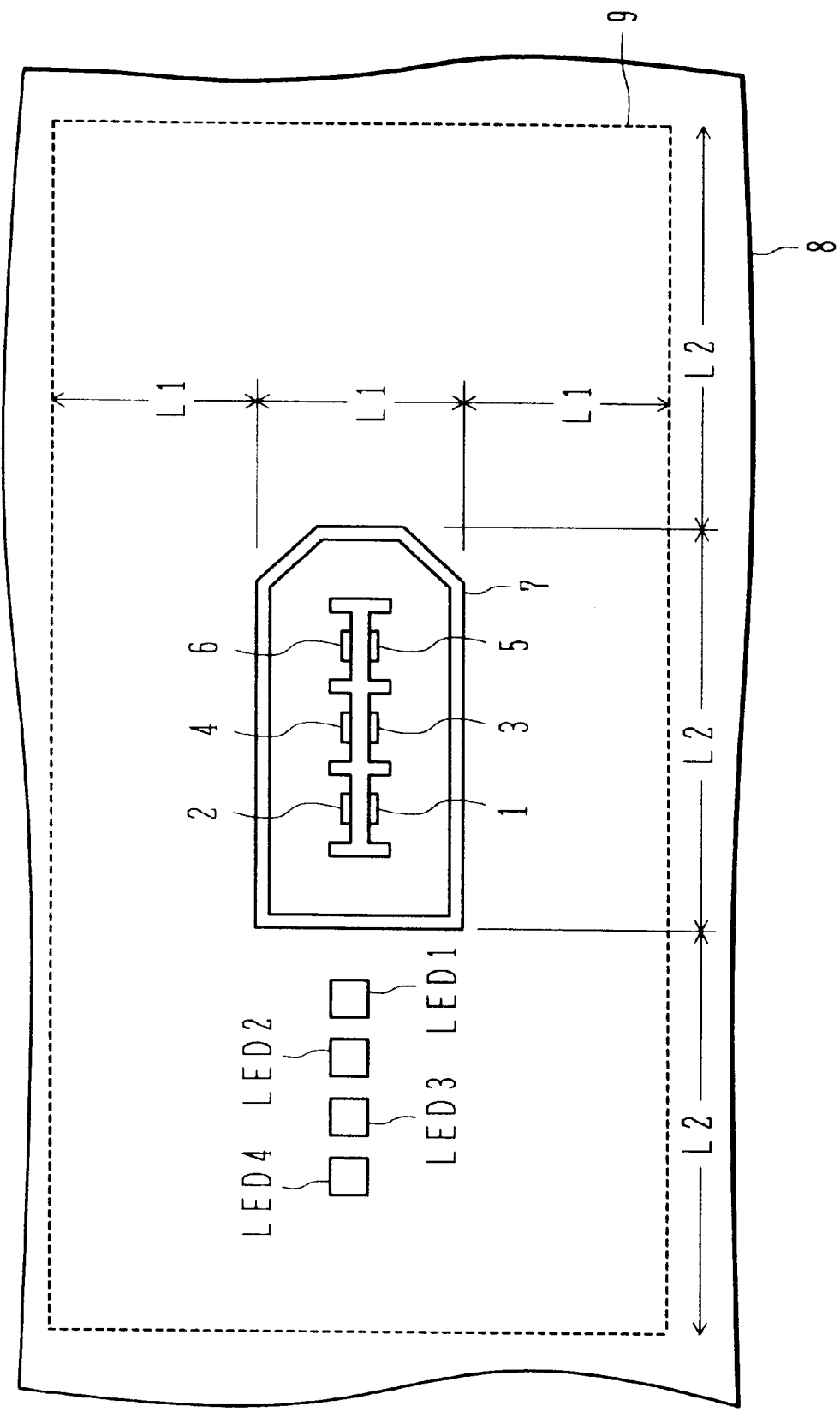
FIG. 2 is a front view of a panel of the communications apparatus.

FIG. 2 is a right side view of the node ND shown in FIG. 1, showing a panel 8 to be used for the connection to the cable CBL.

The panel 8 is not necessarily required to be mounted on the side wall of the node ND, but it may be mounted on the front or back wall. The panel 8 is provided with a communication cable receptacle 7 for the connection of the communication cable CBL (FIG. 1) and the four light emitting diodes LED1 to LED4.

For example, the communication cable receptacle 7 is a cable receptacle of IEEE 1394. The receptacle 7 has a power supply terminal 1, a ground terminal 2, first signal terminals 3 and 4, and second signal terminals 5 and 6. For example, the power supply terminal 1 is used for +3.3 V or +5 V. The first and second signal terminals 3 to 6 are used for the reception/transmission of a data signal and a strobe signal.

The communication cable CBL shown in FIG. 1 is connected to the communication cable receptacle 7. The communication cable CBL has six lines corresponding to the six terminals 1 to 6 of the communication cable receptacle 7.

A communication cable of IEEE 1394 has six lines as described above, including two power supply lines (power supply terminals 1 and 2) and four signal lines (signal terminals 3 to 6). A communication cable of USB has four lines including two power supply lines (power supply terminals) and two signal lines (signal terminals).

It is preferable to provide the light emitting diodes LED1 to LED4 near the communication cable receptacle 7, or if there are a plurality of other communication cable receptacles, nearer the communication cable receptacle 7 than the other communication cable receptacles. Of the four light emitting diodes LED1 to LED4, the light emitting diode LED1 nearest the communication cable receptacle 7 is preferably set in a region 9.

Next, the region 9 will be described. The communication cable receptacle 7 has a width L2 and a height L1. The region 9 is a region occupying an area extending from the right and left sides of the communication cable receptacle by the width L2 and from the upper and lower sides thereof by the height L1. Namely, the region 9 is a rectangular region occupying an area extending by one size of the communication cable receptacle 7 from the right/left sides and upper/lower sides of the communication cable receptacle 7, and has an area of 3×L1×3×L2.

Next, the light emitting diodes LED1 to LED4 will be described. The light emitting diodes LED1 to LED4 are selectively connected to the power supply terminal 1 and ground terminal 2 of the communication cable receptacle 7. Each of the light emitting diodes LED1 to LED4 emits light when it is connected to the power supply terminal 1 and ground terminal 2.

In the following description, each or all of the light emitting diodes LED1 to LED4 are simply called a light emitting diode LED.

Each light emitting diode LED includes two light emitting diodes, a red light emitting diode and a green light emitting diode, and can display four states. Namely, four light emitting diode units each capable of displaying four states are provided. Next, a method of displaying the four states by each light emitting diode unit will be described.

The first state corresponds to that the red and green light emitting diodes are turned off, i.e., the light emitting diode unit is turned off.

The second state corresponds to that the red light emitting diode is turned on and the green light emitting diode is turned off, i.e., the light emitting diode unit emits red light.

The third state corresponds to that the red light emitting diode is turned off and the green light emitting diode is turned on, i.e., the light emitting diode unit emits green light.

The fourth state corresponds to that the red and green light emitting diodes are turned on, i.e., the light emitting diode unit emits orange light.

Each light emitting diode unit displays one of the four states in accordance with the communication state of the node ND. Next, a relation between each light emitting diode unit LED1 to LED4 and the communication state and other states will be described.

(1) Light Emitting Diode Unit LED1

| State of light emitting diode unit | State of communication |
|---|---|
| Green | Transmission |
| Red | Reception |
| Orange | Bus reset |
| Turn off | Neither transmission/ reception nor bus reset |

If the node is in transmission, the light emitting diode unit LED1 emits green light. If the node is in reception, the light emitting diode unit LED1 emits red light. If the communications network including this node is in bus reset, the light emitting diode unit LED1 emits orange light.

The bus reset is a reset state stipulated by IEEE 1394 specifications. For example, when the communication cable CBL is connected to or disconnected from a node ND in order to add a new node to the network or remove the already connected node from the network, the network enters the bus reset state. This bus reset corresponds to initialization for configuring a new network.

If neither the communications network is in bus reset nor the node is in transmission/reception, the light emitting diode unit LED1 is turned off.

(2) Light Emitting Diode Unit LED2

| State of light emitting diode unit | Power supply of node | Repeat function |
|---|---|---|
| Green | Off | On |
| Orange | On | On |
| Turn off | Off | Off |

The light emitting diode unit LED2 displays the state of the node ND. For example, the state of the node includes a power on/off of the node ND and a repeat function on/off.

If the AC 100 V power source (or battery) 14 shown in FIG. 1 is connected to the node ND and the power switch 15 is turned on, then a power is supplied to the node ND and the light emitting diode unit LED2 emits orange light. If both the AC 100 V power source 14 and battery 14 are not connected to the node ND or if the power switch 15 is turned off, then a power is not supplied to the node ND, and the light emitting diode unit LED2 either emits green light or is turned off, depending upon the state of a repeat function.

Figure 6:
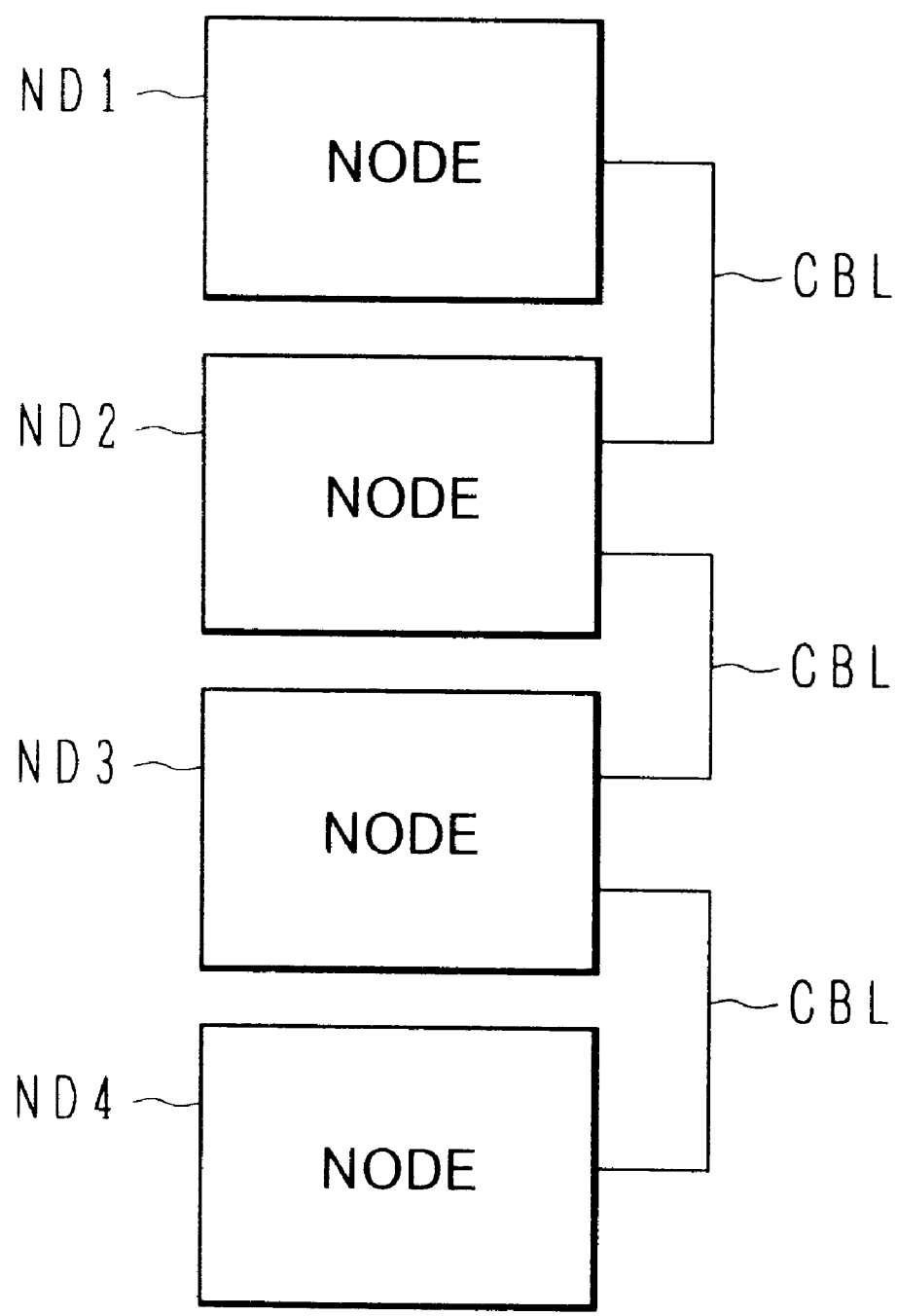
FIG. 6 is a block diagram showing the structure of a communications network.

On/off of the repeat function corresponds to on/off of the function of the node ND as a repeater. For example, if the repeat function of the node ND2 shown in FIG. 6 is on, the node ND2 can relay data communications between the nodes ND1 and ND3.

If a power is supplied to the communication interface unit 11 shown in FIG. 1, the communication interface unit 11 can provide the repeat function. If the power switch is turned on and a power is supplied from its own node ND, the repeat function is always on and the light emitting diode unit LED2 emits orange light.

Even if the power switch of the node ND is turned off, a power can be supplied via the communication cable CBL (FIG. 1) from another node ND whose power switch is turned on. In the case wherein the power switch of the node is turned off and the repeat function is on, the light emitting diode unit LED2 emits green light.

If the power switches of all the nodes constituting the communications network are turned off, all the nodes ND cannot be supplied with a power via the communication cable CBL. If the power switch of the node is turned on, a power is supplied from its power source 14 to the power supply lines 17 (power supply terminals 1, 2 of the communication cable receptacle 7) of the communication cable CBL. Conversely, if the power switch of the node is turned off, a power is not supplied from its power source 14 to the power supply lines 17 (power supply terminals 1, 2 of the communication cable receptacle 7). In this case, the repeat function is off and the light emitting diode unit LED2 is turned off.

(3) Light Emitting Diode Unit LED3

The light emitting diode unit LED3 displays an inhibition state of connection/disconnection of the communication cable to/from the node ND. The on-state of the light emitting diode unit LED3 gives a user an alarm that the communication cable CBL is inhibited from being connected or disconnected.

For example, while the node ND is in transmission or reception, the light emitting diode unit LED3 is turned on to notify the user of a connection/disconnection inhibition state of the communication cable CBL.

(4) Light Emitting Diode Unit LED4

The light emitting diode element LED4 displays the connection state of the node in the communications network. For example, if the node ND is in a leaf state in the communications network, the light emitting diode unit LED4 is turned on. The leaf state means that the node is the end node in the network. For example, the nodes ND1 and ND4 shown in FIG. 6 are the end nodes of the communications network. If a single communication cable CBL is connected to the node ND, this node is in the leaf state, whereas if two or more communication cables CBL are connected to the node, this node is not in the leaf state.

Even if the node ND is not in the leaf state, the light emitting diode unit LED3 may be turned on if the node ND is in transmission or reception, in order to notify a user of a connection/disconnection inhibition state of the communication cable CBL at this node. This is because it is necessary to inhibit the connection/disconnection of the communication cable so that the node ND not in the leaf state can provide the repeat function.

Figure 3:
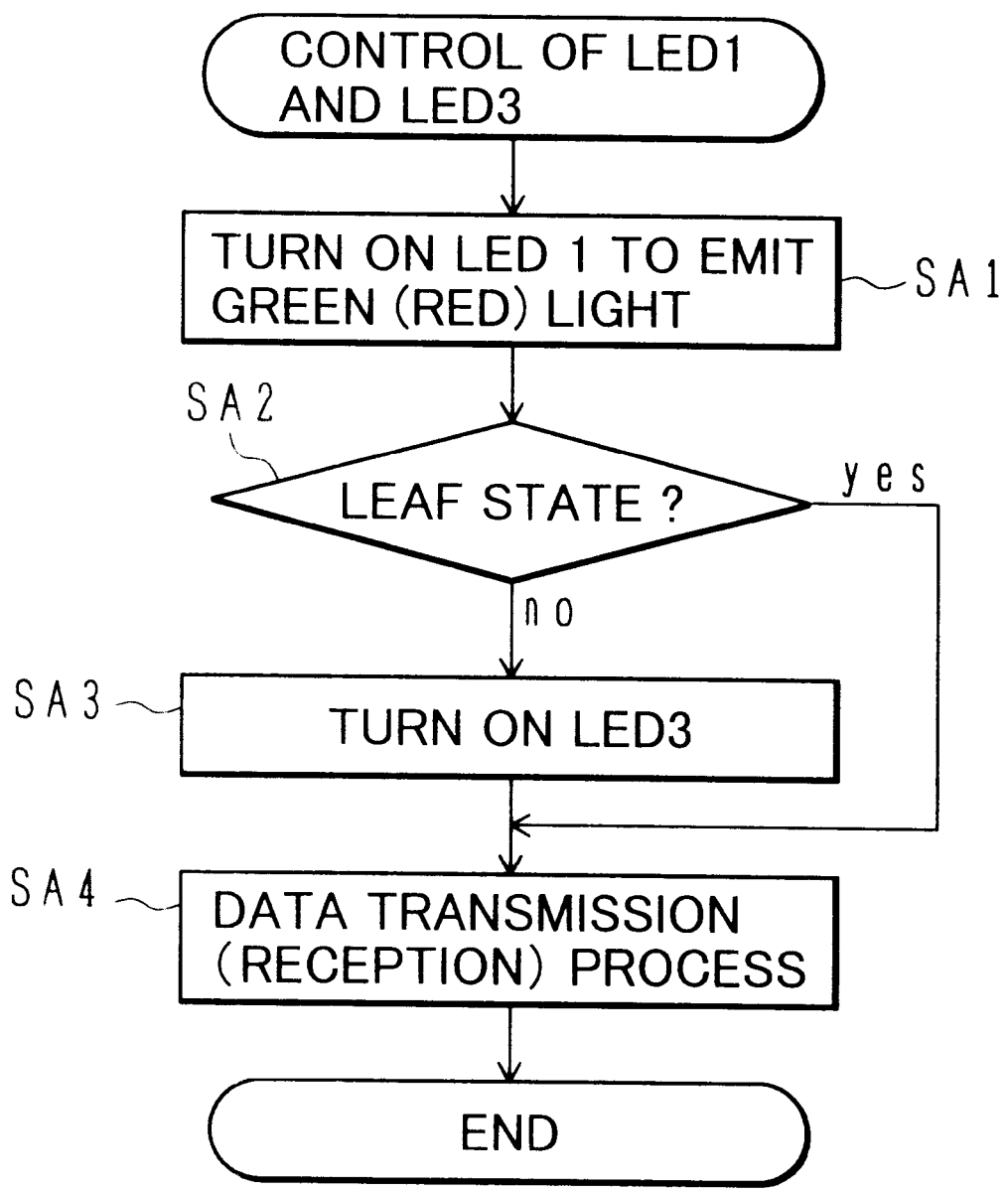
FIG. 3 is a flow chart illustrating the operation of controlling light emitting diodes LED 1 and LED 3.

FIG. 3 is a flow chart illustrating the operation of controlling the light emitting diode units LED1 and LED3. The processes in this flow chart are performed by the control unit 13 shown in FIG. 1 each time the node ND transmits or receives data.

At Step SA1, upon data transmission/reception, the light emitting diode unit LED1 emits green/red light. Upon data transmission, the light emitting diode unit LED1 emits green light. Upon data reception, the light emitting diode unit LED1 emits red light.

At Step SA2, it is checked whether the node ND is in the leaf state. If not, it is necessary to provide the repeat function of the node ND, so that the flow advances to Step SA3 whereat the light emitting diode unit LED3 is turned on. The turn-on of the light emitting diode unit LED3 notifies a user of the connection/disconnection inhibition state of the communication cable CBL at this node. Thereafter, the flow advances to Step SA4.

If the node ND is in the leaf state, it is necessary to provide the repeat function of the node ND, so that the flow skips to Step SA4 without turning on the light emitting diode unit LED3 (or by turning off the light emitting diode unit LED3).

At Step SA4, a data transmission or reception process is performed to thereafter terminate the control operation of this flow chart.

Thereafter, data transmission/reception is monitored periodically by using a timer. When a completion of data transmission/reception is detected, the turn-on of the light emitting diode unit LED1 and/or LED3 is maintained for a predetermined time (e.g., 1 to 2 seconds) and thereafter it is turned off.

Figure 4:
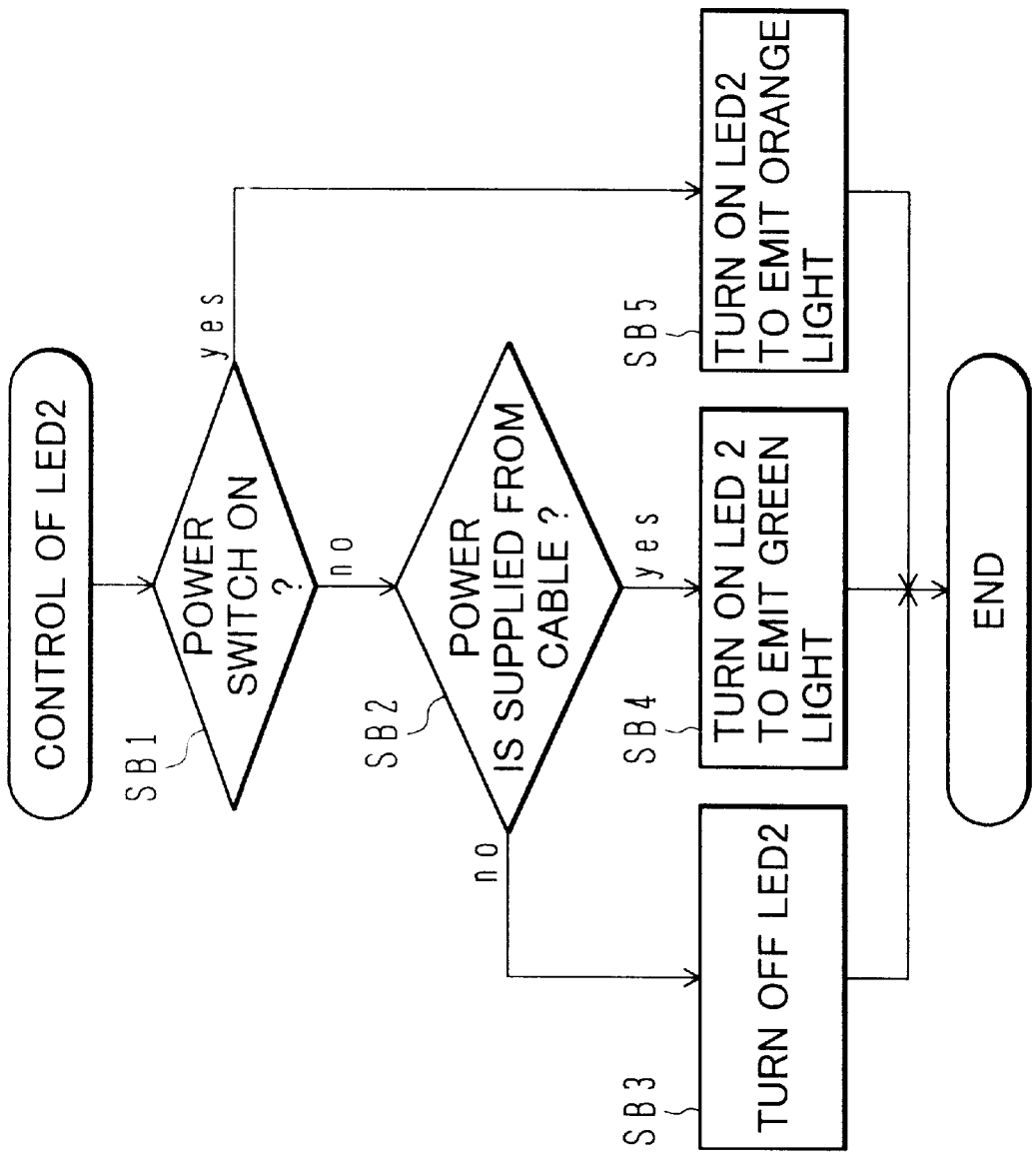
FIG. 4 is a flow chart illustrating the operation of controlling a light emitting diode LED2.

FIG. 4 is a flow chart illustrating the operation of controlling the light emitting diode unit LED2. The processes in this flow chart are performed by the control unit 13 shown in FIG. 1 when the power switch of the node ND is turned on or off or when the communication cable CBL is connected to or disconnected from the node ND.

At Step SB1, it is checked whether the power switch of the node is turned on. If turned on, the flow advances to Step SB5 following a yes arrow, whereas if not, the flow advances to Step SB2 following a no arrow.

At Step SB2, it is checked whether a power is being supplied to the node ND from the communication cable CBL. If supplied, the flow advances to Step SB4 following a yes arrow, whereas if not, the flow advances to Step SB3 following a no arrow.

At Step SB3, the light emitting diode unit LED2 is turned on in order to notify a user of that the power switch of the node ND is turned off and that a power is not supplied via the communication cable CBL (i.e., the repeat function is turned off). In this case, the light emitting diode unit LED2 turns off without any control because a power is not supplied from any node. Although this process is not positively controlled at the node, it is shown logically in the flow chart of FIG. 4.

At Step SB4, the light emitting diode unit LED2 is turned on to emit green light in order to notify the user of that the power switch of the node ND is turned on and that a power is also supplied via the communication cable CBL (i.e., the repeat function is turned on).

At Step SB5, the light emitting diode unit LED2 is turned on to emit orange light in order to notify the user of that the power switch of the node ND is turned on and that the repeat function is turned on. With the above processes, the control operation of this flow chart is terminated.

Figure 5:
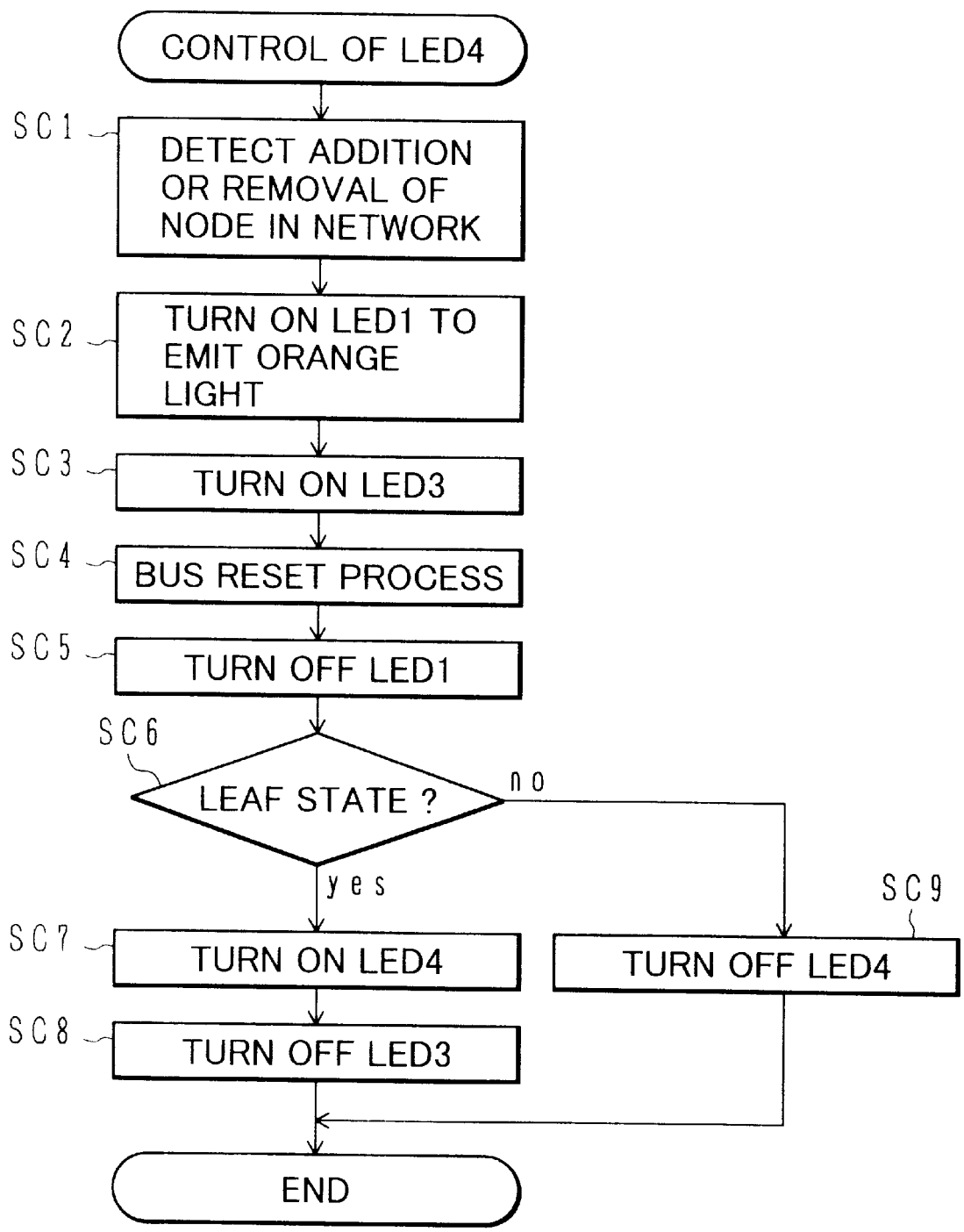
FIG. 5 is a flow chart illustrating the operation of controlling a light emitting diode LED4.

FIG. 5 is a flow chart illustrating the operation of controlling the light emitting diode unit LED4 to be executed by the control unit 13 shown in FIG. 1.

At Step SC1, it is checked whether any node ND is added to or removed from the communications network. Namely, it is checked whether the communication cable CBL is connected to or disconnected from a node ND. When addition or removal is detected, the following processes are performed.

At Step SC2, the light emitting diode unit LED1 is turned on to emit orange light in order to notify a user of that the communications network is in a bus reset state.

At Step SC3, the light emitting diode unit LED3 is turned on to notify the user of the connection/disconnection inhibition state of the communication cable CBL at this node ND.

At Step SC4, a bus reset process (initialization) of the communications network is performed. Specifically, an ID number is newly assigned to each node and a new root node is determined. After this process, the bus reset state is released.

At Step SC5, the light emitting diode unit LED1 is turned off in order to notify the user of that the communications network is not in the bus reset state and that the node ND is not in transmission/reception.

At Step SC6, it is checked whether the node ND is in the leaf state. If not, the flow advances to Step SC9 following a no arrow, whereat the light emitting diode unit LED4 is turned off in order to notify the user of that the node ND is not in the leaf state. Thereafter, the control operation of this flow chart is terminated.

If it is judged at Step SC6 that the node ND is in the leaf state, the flow advances to Step SC7 following a yes arrow, whereat the light emitting diode unit LED4 is turned on in order to notify the user of that the node ND is not in the leaf state. Thereafter, the flow advances to Step SC8.

At Step SC8, since the node ND is in the leaf state and is not required to provide the repeat function, the light emitting diode unit LED3 is turned off in order to notify the user of the connection/disconnection enabled state of the communication cable CBL at this node ND. With the above processes, the control operation of this flow chart is terminated.

The control operations for the light emitting diode units LED1 to LED4 shown in FIGS. 3 to 5 are not limited only to being executed under the above-described conditions, but they may be executed under different conditions. The control operations for the light emitting diode units LED1 to LED4 may be executed by properly combining the control operations in accordance with predetermined conditions.

The light emitting diode unit LED1 displays the communication state such as transmission/reception and bus reset. The light emitting diode unit LED2 displays the state of its node ND such as power switch on/off and repeat function on/off. The light emitting diode unit LED3 displays the alarm state such as a connection/disconnection inhibition of the communication cable. The light emitting diode unit LED4 displays the connection state of its node ND in the communications network such as a leaf state.

The light emitting diode units LED1 to LED4 are selectively connected to the power supply lines of the communication cable CBL. Even if the power switch of the node ND is turned off, the light emitting diode units LED1 to LED4 can receive a power from another node ND via the communication cable CBL and emit light.

Even if the power switch of the node ND is turned off, the light emitting diode units LED1 to LED4 can display the communication state, the state of the node ND, the alarm state, and the connection state of the node in the network.

If the power switch of a communications modem, a hard disk drive or the like is turned off, a display by the light emitting diode is not possible. However, even if the power switch of the node (communications apparatus) of this embodiment is turned off, displays by the light emitting diode units LED1 to LED4 are possible.

According to IEEE 1394, even if the power switch of a node ND is turned off, the node ND may server as the repeater. It is necessary and possible for the light emitting diode units LED1 to LED4 to display the bus reset state, repeat function state, alarm state and leaf state even if the switch of the node ND is turned off.

If the light emitting diode units LED1 to LED4 are provided near the communication cable receptacle 7, the communication state of the communication cable receptacle 7 can be easily confirmed.

If a node ND is provided with a plurality of communication cable receptacles, light emitting diode units are provided near each communication cable receptacle so that the communication state of each communication cable receptacle can be easily confirmed.

If the light emitting diode units are provided near the communication cable receptacle, the illumination state of the light emitting diode units can be seen easily when a user tries to connect or disconnect the communication cable. It is preferable to provide the light emitting diode units, particularly the light emitting diode unit for displaying a connection/disconnection inhibition state, near the communication cable receptacle.

In the embodiment, although a plurality of display states are realized by light emitting diodes of different colors, this is not limitative but a plurality of display states may be realized by different numbers of turned-on light emitting diodes of the same color. Instead of a light emitting diode, other light emitting elements such as incandescent lamps and fluorescent lamps may be used.

The communication interface unit 11 (FIG. 1) is not limited to an interface for digital serial communications, but it may be an interface for parallel communications or analog communications.

The present invention has been described in connection with the preferred embodiments. The invention is not limited only to the above embodiments. It is apparent that various modifications, improvements, combinations, and the like can be made by those skilled in the art.

What is claimed is:

1. A communications apparatus comprising:
   a communication cable receptacle having signal terminals and power supply terminals for connection to a communication cable having signal lines and power supply lines;
   a communication interface for transferring a signal to and from an external via the signal terminals of said communication cable receptacle; and
   one or a plurality of light emitting elements capable of emitting light, said light emitting element being selectively connected to the power supply terminals of said communication cable receptacle and receiving a power from the communication cable via the power supply terminals.

2. A communications apparatus according to claim 1, further comprising an independent power source unit of the apparatus capable of supplying a power to said light emitting element independently from the power supply lines of the communication cable and capable of supplying a power to the power supply terminals of said communication cable receptacle.

3. A communications apparatus according to claim 2, wherein said light emitting element changes light emitting states depending on a combination of a supplying state of said signal from the signal lines of the communication cable and said power from the power supply lines and a supplying state of said power from the independent power supply.

4. A communications apparatus according to claim 3, wherein said light emitting states are represented by colors of emitting light.

5. A communications appartus according to claim 3, wherein said light emitting states are represented by turning on/off of said light emitting element.

6. A communications apparatus according to claim 2, wherein said light emitting element can display an on-state or an off-state of said independent power source unit.

7. A communications apparatus according to claim 2, wherein said light emitting element can display information on whether said independent power source unit is supplying a power to the power supply terminals of said communication cable receptacle.

8. A communications apparatus according to claim 2, wherein said light emitting element can emit light by selectively receiving a power from the communication cable or by selectively receiving a power from said independent power source unit.

9. A communications apparatus according to claim 8, wherein even if said independent power source unit does not supply a power to the power supply terminals of said communication cable receptacle, said light emitting element can emit light by selectively receiving a power from the communication cable.

10. A communications apparatus according to claim 1, wherein said light emitting element can display at least one of a communication state, a state of the apparatus, an alarm state, and a connection state of the apparatus.

11. A communications apparatus according to claim 10, wherein said light emitting element is disposed near said communication cable receptacle.

12. A communications apparatus according to claim 1, wherein said light emitting element is disposed near said communication cable receptacle.

13. A communications apparatus according to claim 12, wherein at least one of said one or a plurality of light emitting elements is provided in a rectangular region occupying an area extending by one size of said communication cable receptacle from right/left sides and upper/lower sides of said communication cable receptacle.

14. A communications apparatus according to claim 12, further comprising another communication cable receptacle, wherein said light emitting element is disposed nearer said communication cable receptacle than said other communication cable receptacle.

15. A communications apparatus according to claim 1, wherein said light emitting element can display a communication state.

16. A communications apparatus according to claim 15, wherein said light emitting element can display a transmission state and/or a reception state.

17. A communications apparatus according to claim 15, wherein said light emitting element can display a bus reset state.

18. A communications apparatus according to claim 1, wherein said light emitting element can display a communication state of the apparatus.

19. A communications apparatus according to claim 18, wherein said light emitting element can display information on whether the apparatus is providing a repeater function.

20. A communications apparatus according to claim 1, wherein said light emitting element can display an alarm state of the apparatus.

21. A communications apparatus according to claim 20, wherein said light emitting element can display a connection/disconnection inhibition state of the communication cable.

22. A communications apparatus according to claim 1, wherein said light emitting element can display a connection state of the apparatus.

23. A communications apparatus according to claim 22, wherein said light emitting element can display a leaf state of the connection state of the apparatus.

24. A communications apparatus according to claim 1, wherein said light emitting element is a light emitting diode.

25. A communications apparatus according to claim 1, wherein said light emitting element can emit light of a plurality of colors.

26. A communications apparatus according to claim 1, wherein said communication interface is a digital serial communication interface.

27. A communications apparatus according to claim 26, wherein said communication interface is a communication interface of IEEE 1394 or USB.

28. A communications apparatus according to claim 26, wherein said communication interface is a communication interface of IEEE 1394.

29. A communications apparatus according to claim 26, wherein said communication interface is a communication interface of USB.

30. A communications apparatus according to claim 1, wherein said communication cable receptacle has two power supply terminals and four signal terminals.

31. A communications apparatus according to claim 1, wherein said communication cable receptacle has two power supply terminals and two signal terminals.

32. A communications apparatus according to claim 1, wherein the apparatus comprises a plurality of light emitting elements.

33. A communications apparatus forming a communication network, comprising:

a communication cable receptacle having signal terminals and power supply terminals for connection to a communication cable having signal lines and power supply lines;

one or a plurality of light emitting elements disposed near said communication cable receptacle, selectively connected to the power supply terminals of said communication cable receptacle and receiving the power from the communication cable via the power supply terminals, and can display at least one of a communication state, a state of the apparatus, an alarm state, and a connection state of the apparatus; and a communication interface that, by receiving the power via the power supply terminals of said communication cable receptacle, transfers a signal to and from an external device forming the communication network via the signal terminals of said communication cable receptacle and can control said one or plurality of light emitting elements.

34. A communications apparatus according to claim 33, wherein said light emitting element displays a communication state in accordance with a receiving/transmitting state of the signal transferred via said signal terminal and displays an alarm of inhibiting a connection/disconnection the communication cable connected to the communication cable receptacle when the signal is being transferred.

35. A communications apparatus according to claim 33, wherein said light emitting element displays whether the communication apparatus is in a leaf-state in which the communication apparatus is an end node in said communication network or not.

36. A communications apparatus according to claim 33, wherein said communication network initializes the communication network in accordance with an occurrence of a connection/disconnection of the communication cable connected to either one of external devices forming the communication network, and said light emitting element displays that the communication network is being initialized.

37. A communications apparatus forming a communication network, comprising:

a communication cable receptacle having signal terminals and power supply terminals for connection to a communication cable having signal lines and power supply lines;

one or a plurality of light emitting elements disposed near said communication cable receptacle, selectively connected to the power supply terminals of said communication cable receptacle and receiving the power from the communication cable via the power supply terminals, and can display at least one of a communication state, a state of the apparatus, an alarm state, and a connection state of the apparatus; and a communication interface that, by receiving the power via the power supply terminals of said communication cable receptacle, transfers a signal to and from external devices forming the communication network via the signal terminals of said communication cable receptacle and can control said one or plurality of light emitting elements, and wherein said communication interface provides a repeat function that relays a signal between said external devices forming the communication network by receiving the power via the power supply terminals of said communication cable receptacle and controls said one or plurality of light emitting elements to emit light in accordance with a predetermined condition by receiving. the power via the power supply terminals of said communication cable receptacle when a power supply of the communications apparatus is turned off.

38. A communications apparatus according to claim 37, wherein said light emitting element display whether the repeat function is provided or not when a power supply of the communications apparatus is turned off.

* * * * *